Sept. 17, 1957 M. L. MacKNIGHT 2,806,947

METHOD AND CIRCUITS FOR SYNCHRONIZING COUNTERS

Filed May 12, 1954 3 Sheets-Sheet 1

INVENTOR.
MERRITT L. MACKNIGHT,
BY
Henry Hyman
ATTORNEY.

Sept. 17, 1957 M. L. MacKNIGHT 2,806,947

METHOD AND CIRCUITS FOR SYNCHRONIZING COUNTERS

Filed May 12, 1954 3 Sheets-Sheet 2

INVENTOR
MERRITT L. MACKNIGHT,
BY
Henry Heyman
ATTORNEY.

Sept. 17, 1957 M. L. MacKNIGHT 2,806,947

METHOD AND CIRCUITS FOR SYNCHRONIZING COUNTERS

Filed May 12, 1954 3 Sheets-Sheet 3

INVENTOR
MERRITT L. MacKNIGHT,
BY
Henry Heyman
ATTORNEY.

United States Patent Office
2,806,947
Patented Sept. 17, 1957

2,806,947

METHOD AND CIRCUITS FOR SYNCHRONIZING COUNTERS

Merritt L. MacKnight, Manhattan Beach, Calif., assignor to Hughes Aircraft Company, Culver City, Calif., a corporation of Delaware Application May 12, 1954, Serial No. 429,281
10 Claims. (Cl. 250—27)

This invention relates to a method and circuits for synchronizing counters, and more particularly to a method and circuits for initiating and maintaining synchronism between an electronic counter circuit and synchronizing signals having a repetition period different from the free-running or natural period of the counter.

In many applications it is desirable to maintain synchronous operation of a counter with respect to a periodic cycle of countable events, each count being produced by the counter in response to a particular event of the cycle. As an example, in a digital computer an electronic counting circuit may be utilized to identify successive time intervals by counting timing or clock-pulses which occur at the beginning of each time interval. Thus, if a series of seven binary signals occurring during successive time intervals are employed to represent an information character, a scale-of-seven counter may be utilized to identify each binary signal of the series by associating a particular count with each signal.

In the prior art the general technique for resetting a counter has been to instantaneously set all counter stages to a predetermined set of states representing an initial count. This resetting technique usually requires the application of a reset signal to each counter stage input circuit, as for example, in the reset circuit found in U. S. Patent Serial No. 2,568,918 entitled "Reset Circuit for Electronic Counters" by I. E. Grosdoff, issued September 25, 1951. According to the reset technique of this patent signals are applied to one input circuit of all counter stages to inhibit the application of counting pulses, and other signals are simultaneously applied to the other input circuits of the counter stages in order to reset the stages to a set of stable states representing the initial count.

The instantaneous reset techniques of the prior art have been suitable for controlling a counter to count through an undetermined portion of its natural cycle, then to return instantaneously to the zero count state when a new cycle is to be commenced. These techniques have also been useful for maintaining synchronous operation of a counter at its free-running or natural period, the reset pulses being spaced by a number of counts equal to the natural count of the counter.

The primary disadvantage of the prior art lies in the fact that the methods required for the instantaneous reset are unnecessarily complicated where they are utilized in applications where an instantaneous reset is not required. This sort of complication results from the fact that the prior art technique does not fully utilize the initial resetting time which may be allowed in initiating the operation of a counter. Thus, no simplification is achieved in the prior art resetting or synchronizing circuits by allowing a longer period of time for the resetting operation.

The significance of the disadvantage of the prior art technique becomes more readily apparent where the counter circuits without synchronization are very simply mechanized. In this situation the introduction of the conventional resetting or synchronizing circuits may result in an almost double complexity in the gating circuits, as well as a considerable increase in the amount of loading upon the counter stages. An example of a typical situation which may occur is in the increase of circuit complexity which results when counters of the type described in copending U. S. patent application Serial No. 327,131 for "Binary-Coded Flip-Flop Counters," by Robert R. Johnson, filed December 20, 1952, are reset and synchronized according to conventional techniques. It is evident from an analysis of the problem that if the synchronizing techniques of the prior art are utilized in conjunction with the type of counter described in the Johnson application, the advantages of the counter would be largely destroyed by the complexity of the means for controlling it.

The above and other disadvantages of prior art reset circuits are obviated, according to the present invention, by allowing an initial synchronizing period during which the counter to be reset is caused to precess with respect to applied synchronizing signals until one synchronizing signal coincides with a predetermined count of the free-running or natural counting cycle. Precession is defined as the coincidence of successive synchronizing signals with progressively different counts of the counter. After the precession period, the counter is maintained in synchronism with the synchronizing signals in the desired counting cycle which includes a number of counts equal to an altered counting cycle plus an integral multiple of the number of counts in the natural cycle.

As used herein, the term "natural counting cycle" and the term "natural period of operation" are each defined as the number of count signals to which the counter responds in order to complete a full operating cycle, in the absence of any applied synchronizing signals.

In its basic structural form the invention comprises a first gating circuit coupled to at least one flip-flop input circuit of the counter to be controlled for applying synchronizing signals to the flip-flop input circuit in a manner such that the counter is actuated to precess until one synchronizing signal coincides with the predetermined count of the natural counting cycle. The synchronizing circuit also includes a second gating circuit which is coupled to at least one flip-flop input circuit, the second gating circuit being responsive to the one synchronizing signal which coincides with the predetermined count for actuating the counter to initiate an altered counting cycle; the number of counts in the altered cycle being less than the number of counts in the desired counting cycle by an integral multiple of the number of counts in the natural counting cycle.

An altered counting cycle as herein referred to is one which results from the introduction of the synchronizing signal into the control function for at least one flip-flop circuit and may in certain cases include only a single counting state indicating that the application of the synchronizing signal inhibits a change in the counter state.

The synchronizing pulse period is always the desired counting cycle period and must be different from the natural counting cycle period. The magnitude of the difference between the synchronizing period and the natural counting period determines the rate or manner of precession. Thus, in a specific form of the present invention, a natural scale-of-eight Johnson counter may be synchronized as a scale-of-nine counter. In this situation the counter will precess, from any random starting state, at the rate of one count position for each application of a synchronizing signal, until the predetermined count is located with initiates the altered counting cycle. The altered counting cycle in this case includes only one count since the counter is caused to lock on the predetermined count when the synchronizing signal is applied.

An important feature of the scale-of-nine counter is that only three flip-flop stages are required where normally four are used. Thus, the synchronizing method of the present invention makes it possible to achieve counting capacities of $2^n+1$ counting states, where $n$ is the number of flip-flops. Such an arrangement does not require additional structure since some sort of synchronizing means is always required in practical applications of counters.

The method of synchronizing the natural scale-of-eight counter above may be considered to be an inhibiting technique where a particular count is held for an additional time interval. It is also possible, according to the present invention, to introduce altered counting cycles by means of an active synchronizing control. Thus, in another specific form of the invention a scale-of-15 Johnson counter is synchronized as a scale-of-14 counter. In this embodiment the synchronizing signal is utilized to introduce additional flip-flop changes into the normal counting sequence, resulting in the skipping over of certain natural counts and the shortening of the counting cycle by one count.

While the specific improvement of the invention is particularly useful in connection with minimum-gating-circuits such as the Johnson counters it may also be utilized in more complicated counting systems with appropriate modification. Thus, a circuit is described for synchronizing a conventional binary counter with a very simple gating circuit.

Accordingly it is an object of the invention to provide a synchronizing circuit which is simply mechanized due to the fact that the counter is precessed during an initial operating period.

Another object of the invention is to provide a method and circuit for synchronizing the operation of a counter circuit in a cycle including a number of counts different from the number of counts in its natural counting cycle.

A further object of the invention is to provide a simple method for synchronizing a counter whereby a predetermined count is located during a first phase of operation and the counter is then actuated into an altered counting cycle in a second phase of operation.

A still further object of the invention is to synchronize the operation of a counter, utilizing a synchronizing matrix which is simply constructed and which minimizes the loading upon the counter circuit.

Still another object of the invention is to provide a circuit for synchronizing a counter at a desired count which differs from its natural count, utilizing precession to achieve initial synchronism within a few counting cycles, and maintaining synchronism thereafter by altering the natural counting cycle of the counter to correspond to the desired count.

Yet a further object of the invention is to provide means for synchronizing a counter at a counting capacity of $2^n+1$, where $n$ is the number of stages in the counter.

Yet another object of the invention is to provide a method and circuit for synchronizing a scale-of-eight counter as a scale-of-nine counter.

An additional object of the invention is to provide a circuit for synchronizing a scale-of-15 counter as a scale-of-14 counter.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 2:
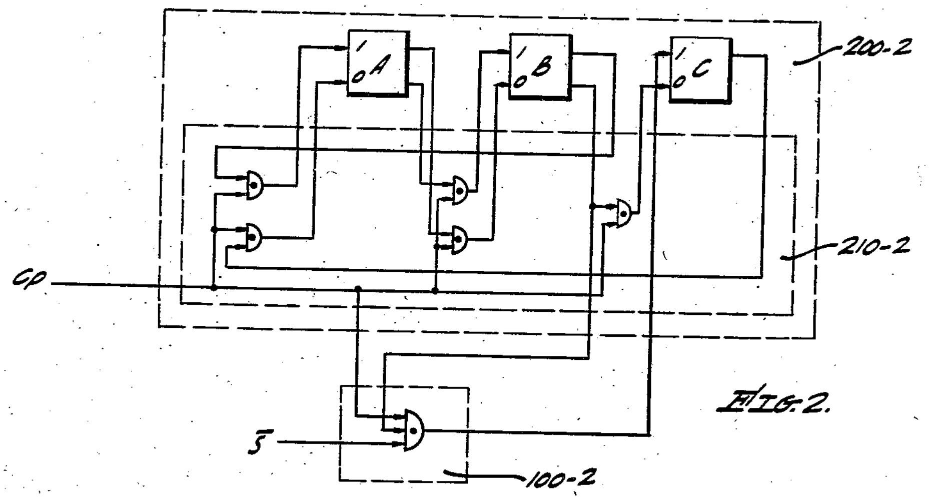
Fig. 2 is a schematic diagram of a synchronizing circuit for controlling a scale-of-eight Johnson counter to operate as a scale-of-nine counter in accordance with the present invention.
Figure 2A:
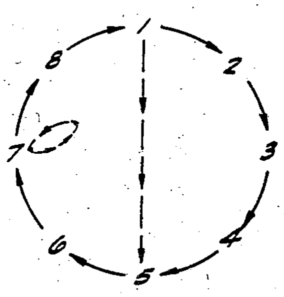
Figures 3, 3A:
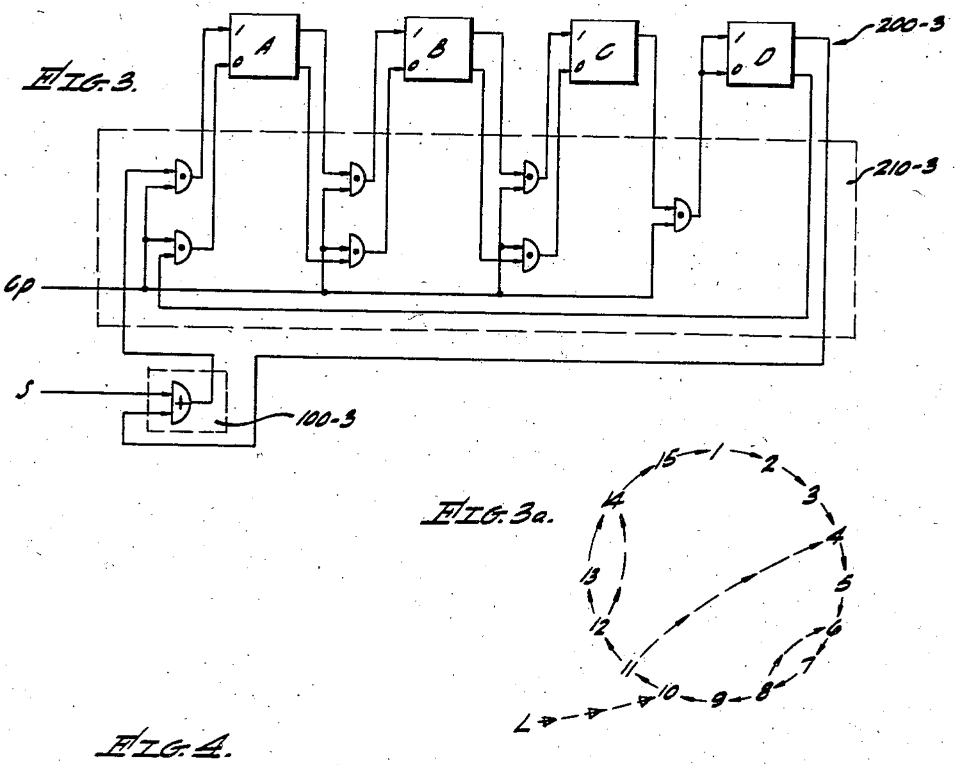
Figure 4:
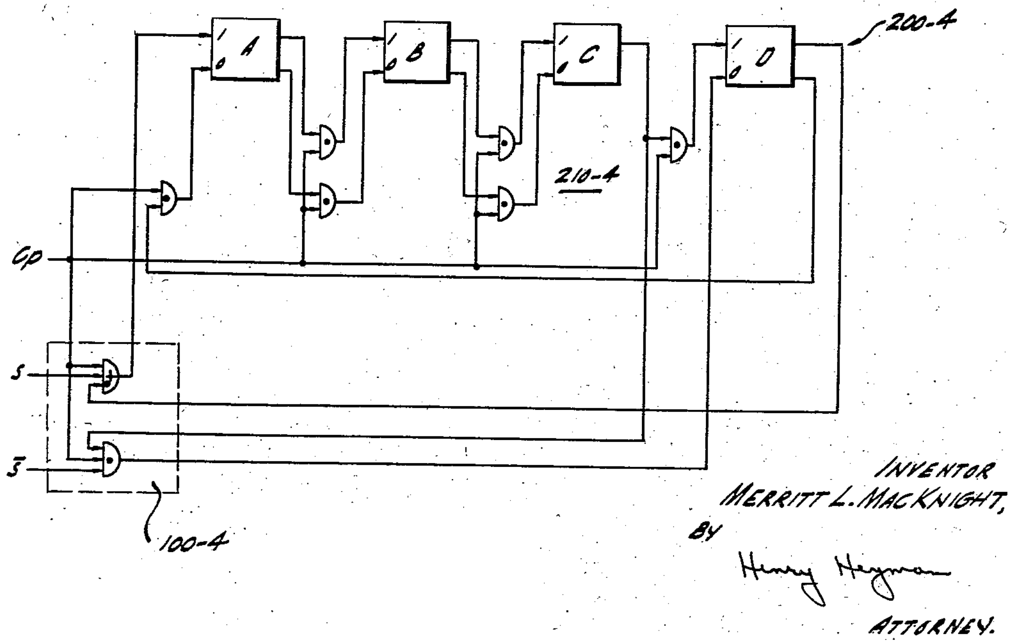
Figure 4A:
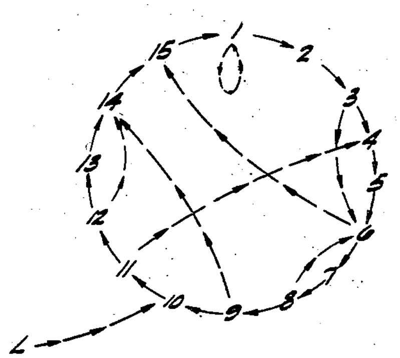
Figure 5:
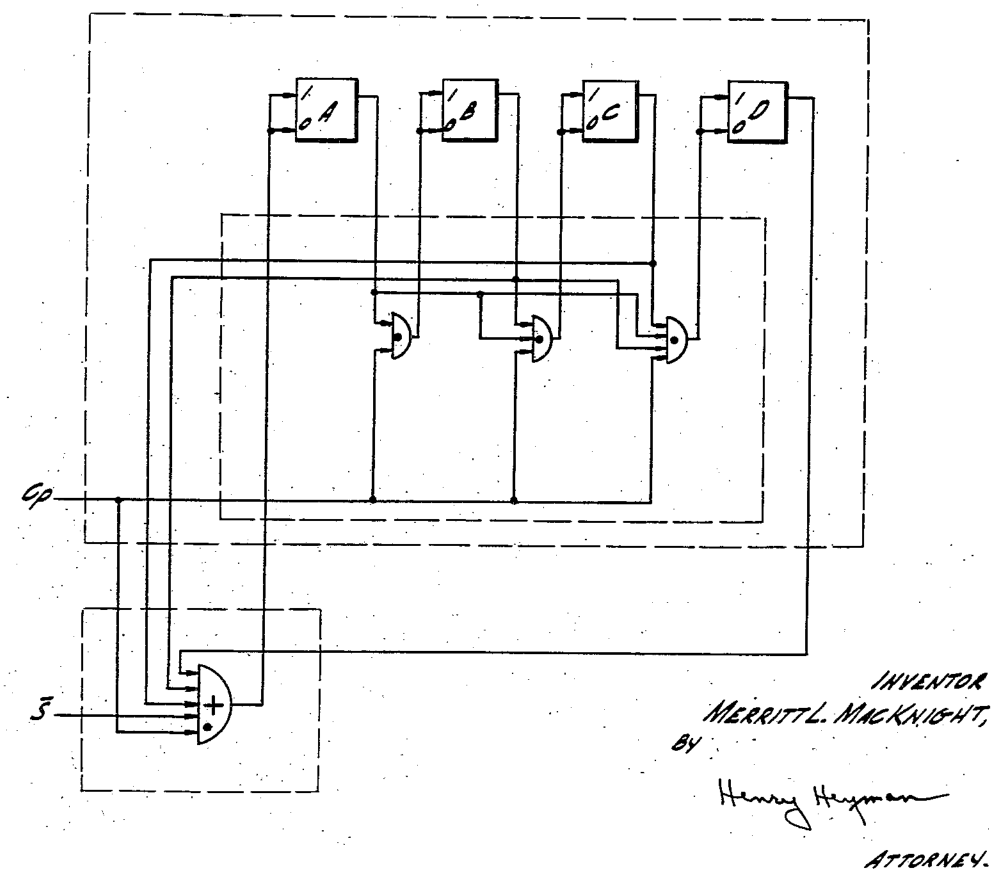

Fig. 2*a* is a diagram illustrating the natural counting cycle and altered counting cycles in the operation of the embodiment of Fig. 2;

Fig. 3 is a schematic diagram of a synchronizing circuit for controlling a scale-of-15 Johnson counter to operate as a scale-of-14 counter;

Fig. 3*a* is a diagram illustrating the natural counting cycle and altered counting cycles in the operation of the embodiment of Fig. 3;

Fig. 4 is a schematic diagram of a synchronizing circuit for controlling a scale-of-15 Johnson counter to operate as a scale-of-16 counter;

Fig. 4*a* is a diagram illustrating the natural counting cycle and altered counting cycles in the operation of the embodiment of Fig. 4; and Fig. 5 is a schematic diagram of a synchronizing circuit for controlling a conventional binary scale-of-16 counter to operate as a scale-of-17 counter.

Figure 1:
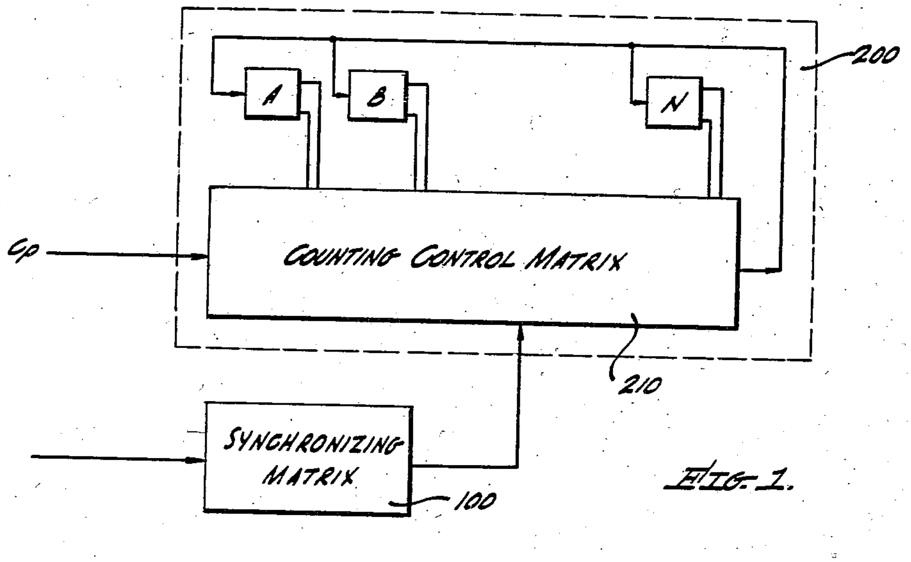
Fig. 1 shows a block diagram of a synchronizing circuit according to the present invention, the circuit being utilized to synchronize the operation of a counter in accordance with the method of the invention.

Reference is now made to Fig. 1 wherein there is shown a synchronizing matrix 100 according to the present invention; synchronizing matrix 100 being responsive to applied synchronizing signals S to produce control signals applied to at least one input flip-flop circuit in a counter 200. The period between synchronizing signals S is selected so that counter 200 is actuated to precess until the time of application of one of the synchronizing signals S coincides with the predetermined starting state of the counter.

As indicated in Fig. 1 counting circuit 200 includes a counting control matrix 210 for receiving and applying a count signal $Cp$ to a plurality of flip-flops A, B, . . . N, where N is the number of flip-flops. Synchronizing matrix 100 produces one or more control signals which are applied through count control matrix 210 to at least one of flip-flops A . . . N and are effective to inhibit or introduce certain flip-flop changes and initiate certain altered counting cycles as will be more fully understood from the detailed description which follows:

It is believed that the invention will be best understood by first considering certain specific forms and then developing a generic theory. Thus, reference is made to Fig. 2 illustrating a specific form of synchronizing matrix 100–2 which is utilized to control the operation of a counter 200–2, normally having scale-of-eight operation under the control of a count control matrix 210–2, to operate as a scale-of-nine counter. The counter may be synchronized in other counting cycles as will be explained.

The natural counting function of counter 200–2 is specified by the equations:

$$1A=B.Cp$$
$$0A=C.Cp$$
$$1B=\overline{A}.Cp$$
$$0B=A.Cp$$
$$1C=0C=\overline{B}.Cp$$

where the symbols 1A, 1B, and 1C represent 1-setting flip-flop input signals and the symbols 0A, 0B, and 0C represent 0-setting flip-flop input signals. It is assumed, as in the above-mentioned copending application to Johnson, that flip-flops A, B, and C are conventional flip-flops such that signals applied separately to the 1-setting and 0-setting input circuits set the flip-flop to stable states representing 1 and 0 respectively, and such that the simultaneous application of signals to both input circuits triggers the flip-flop or changes its stable state. The dot (.) in the logical equations represents the logical "and" indicating that a count pulse $Cp$ is applied to the corresponding input circuit only when all other input signals are 1-representing signals. The bar (‾) over a signal represents the complement. The natural counting cycle of counter 200–2 defined by these equations is indicated in Table I below.

*Table I*

| Count | A | B | C |
|---|---|---|---|
| 1 | 0 | 0 | 0 |
| 2 | 0 | 1 | 1 |
| 3 | 1 | 1 | 1 |
| 4 | 0 | 0 | 1 |
| 5 | 0 | 1 | 0 |
| 6 | 1 | 1 | 0 |
| 7 | 1 | 0 | 0 |
| 8 | 1 | 0 | 1 |

Table I corresponds to Table XI in the Johnson application, the particular counting sequence being numbered in column (5) of Table XI. It will be noted, however, that the particular count number has no particular significance since any desired count may be selected as the starting point. The specific manner in which the natural counting functions are derived will not be considered here since they do not form part of the present invention, the Johnson application therefore being incorporated herein by way of reference.

In referring to Table I it will be noted that by inhibiting the change of flip-flop C from 0 to 1 after count 7, count 7 is thereby repeated, producing an altered counting cycle having one count. This change of flip-flop C from 0 to 1 would also normally occur between the first and second counts, hence inhibiting the change will initiate another altered counting cycle commencing after the first count. These effects may be represented diagrammatically as in Fig. 2*a*, from reference to which it may be noted that the natural counting cycle is designated in solid lines with arrows indicating the direction of progression. The natural counting cycle is shown as including counts 1 through 8, corresponding to the sequence of Table I.

The altered counting cycles which result from inhibiting the change of flip-flop C from 0 to 1 are illustrated by means of dotted lines, with arrows indicating the direction of progression. The locking on count 7 is illustrated by a dotted loop which starts at 7 and returns directly thereto, and a progression from count 1 to count 5 is shown as a dotted line connecting the numeral 1 to the numeral 5.

The inhibiting action referred to above may be accomplished by the application of a signal $\overline{S}$, the complement of synchronizing signal S, to input circuit 1C of flip-flop C. The modified mechanization for the input circuits of flip-flop C then becomes:

$$1C=\overline{B}.Cp.\overline{S}$$
$$0C=\overline{B}.Cp$$

The predetermined count state to which the counter may be reset in accordance with the present invention must be a count state from which, upon coincidence of a synchronizing signal S, an altered counting cycle is initiated. Thus, in the example shown, the predetermined count may be either count 1 or count 7. If the predetermined count is 7, the altered counting cycle which is produced includes only one count, namely, a repetition of count 7. Synchronous operation of the counter may therefore be maintained if the period of the synchronizing signals corresponds to 1, 9, 17, . . . counts. If the predetermined count is count 1, synchronous operation may be maintained if the period of the synchronizing signals corresponds to 5, 13, 21, . . . counts.

It is advantageous at this point to define an altered counting cycle as a cycle which occurs between the application of a synchronizing signal and the return of the counter to the next count of its natural counting cycle. Thus, in the counting pattern illustrated in Fig. 2*a*, there are two altered counting cycles, one having one count (repetition of count 7), and the other having five counts (counts 5, 6, 7, 8, and 1). It is now possible to state in equation form the relation between possible synchronizing periods, the natural counting cycle of the counter, and the various altered counting cycles, as follows:

$$Dc=Ac+K\times Nc$$

where Nc represents the natural count of the counter, Ac represents an altered count, K is any positive integer including zero, and Dc represents the number of counts corresponding to the period of the synchronizing signals.

Applying this general equation to the above example, the following equations apply:

$$Nc=8$$
$$Ac_1=1$$
$$Ac_2=5$$
$$Dc_1=1, 9, 17, 25, \ldots$$
$$Dc_2=5, 13, 21, 29, \ldots$$

where $Dc_1$ and $Dc_2$ represent, respectively, two different sets of values from which the period of synchronizing signals S may be selected.

It will be noted that the counter circuit of Fig. 2 could therefore be maintained in synchronous operation at any of the synchronizing periods indicated. According to Fig. 2 the synchronizing period is in fact equal to nine counts, hence the predetermined count is the seventh count. The full nine counts of the synchronizing period may therefore be identified by considering the presence or absence of signal S in order to distinguish between the first and second occurrences of the seventh count. The first occurrence of the seventh count, during which signal S is present, may be considered as the last count of the new cycle, and the second occurrence of the seventh count as the first count of the new cycle.

In the event that it is desired to commence the counting cycle with a counter state which includes all 0's, this may be achieved by making a transformation in the structure of the counter circuit in accordance with the fundamental principles of Johnson counters, as described in the copending application. By complementing the state of flip-flop A throughout, the natural counting sequence will then be as shown in Table II:

*Table II*

| Count | A | B | C |
|---|---|---|---|
| 7 | 0 | 0 | 0 |
| 8 | 0 | 0 | 1 |
| 1 | 1 | 0 | 0 |
| 2 | 1 | 1 | 1 |
| 3 | 0 | 1 | 1 |
| 4 | 1 | 0 | 1 |
| 5 | 1 | 1 | 0 |
| 6 | 0 | 1 | 0 |

According to the above transformation the matrix functions for the counter become:

$$1A=C.Cp$$
$$0A=B.Cp$$
$$1B=A.Cp$$
$$0B=\overline{A}.Cp$$
$$1C=0C=\overline{B}.Cp$$

and the modified signals to be applied to flip-flop C in order to achieve the counting pattern of Fig. 2*a* would be the same as stated previously.

In synchronizing the operation of the counter circuit shown in Fig. 2 it is necessary not only to satisfy the requirements for maintaining synchronism once it is achieved, but it is also necessary to insure that proper precession will occur to provide the initial synchronism. If the first synchronizing signal coincides with the second count successive signals will coincide with the 3rd, 4th, 5th, 6th, and 7th counts, respectively, thus requiring five synchronizing periods to attain initial synchronism. If the first synchronizing signal coincides with the 8th count successive signals will coincide with the 1st, 5th, 6th, and 7th counts, respectively, thus requiring four synchronizing periods to attain initial synchronism. Synchronism will be attained regardless of the count with which the first synchronizing signal coincides, and the maximum precession time will be five synchronizing periods.

Thus the circuit of Fig. 2 provides synchronous operation of the counter, normally a scale-of-eight counter, as a scale-of-nine counter. The mechanization of both the counter and the synchronizing circuit are extremely simple, thus requiring a minimum of circuit elements and resulting in minimum loading of the counter stages. The counting capacity of nine counts is achieved with only three flip-flops, thus providing a total count of $2^n+1$ instead of the usual $2^n$, where $n$ is the number of flip-flops in the counter.

As previously pointed out the counter circuit of Fig. 2 may be maintained in synchronous operation at 1, 9, 17, 25 . . . counts, or at 5, 13, 21, 29 . . . counts. It is necessary to consider the precession problem, however, for each desired synchronizing period. If the period selected is five counts, then a signal S will coincide with every fifth count signal $Cp$, and also with every 25th count signal $Cp$. If the first signal S coincides with the first or fourth count the counter will synchronize properly at five counts. But if the first signal S coincides with the 7th, 2nd, 5th, 8th, 3rd, or 6th count, then synchronism at 25 counts will result, every 5th signal S coinciding with the 7th count to produce an altered counting cycle having one count and each group of four intervening signals S having no effect upon the natural counting cycle.

It is therefore apparent that if the desired synchronizing period is a submultiple of another possible synchronizing period precession cannot be relied on to obtain the desired synchronism. In the converse situation where the desired synchronizing period is a multiple of another possible period the desired precession may be obtained.

The methods of mechanizing synchronizing matrix 100–2 are not limited to the one shown in Fig. 2. For example, it is possible to inhibit the change of flip-flop C from 1 to 0, thus providing a counting pattern entirely different from that shown in Fig. 2*a*. Other counting patterns may be derived by inhibiting the change of flip-flop A or flip-flop B from 0 to 1, or from 1 to 0. Furthermore, as will be pointed out in the ensuing discussion it is possible to employ an active synchronizing control in lieu of an inhibiting signal, or to employ a combination of both types of signals.

Reference is now made to Fig. 3 illustrating a specific form of synchronizing matrix 100–3 which is utilized to control the operation of the counter 200–3, normally having scale-of-15 operation under the control of a count control matrix 210–3, to operate as a scale-of-14 counter. The counter may be synchronized in other counting cycles as will be explained.

The natural counting function of counter 200–3 is described in copending U. S. patent application Serial Number 373,558 for "Shifting Register Counters," by Robert R. Johnson, filed August 11, 1953, and is specified by the equations:

$$1C=B.Cp$$
$$0C=\overline{B}.Cp$$
$$1B=A.Cp$$
$$0B=\overline{A}.Cp$$
$$1A=D.Cp$$
$$0A=\overline{D.C}p$$
$$1D=0D=C.Cp$$

where the notation is the same as that employed in conjunction with Fig. 2 above. The natural counting cycle of counter 200–3 defined by these equations is indicated in Table III below.

*Table III*

| Count | A | B | C | D |
|---|---|---|---|---|
| 1 | 1 | 1 | 1 | 1 |
| 2 | 1 | 1 | 1 | 0 |
| 3 | 0 | 1 | 1 | 1 |
| 4 | 1 | 0 | 1 | 0 |
| 5 | 0 | 1 | 0 | 1 |
| 6 | 1 | 0 | 1 | 1 |
| 7 | 1 | 1 | 0 | 0 |
| 8 | 0 | 1 | 1 | 0 |
| 9 | 0 | 0 | 1 | 1 |
| 10 | 1 | 0 | 0 | 0 |
| 11 | 0 | 1 | 0 | 0 |
| 12 | 0 | 0 | 1 | 0 |
| 13 | 0 | 0 | 0 | 1 |
| 14 | 1 | 0 | 0 | 1 |
| 15 | 1 | 1 | 0 | 1 |

Synchronizing matrix 100–3 is mechanized with an active synchronizing control in lieu of the inhibiting type of signal employed in matrix 100–2 of Fig. 2. Thus, a modified mechanization for the 1-input function of flip-flop A in the counter of Fig. 3 is provided as follows:

$$1A=(D+S).Cp$$

With this mechanization the counter circuit of Fig. 4 may be controlled for synchronous operation at a period corresponding to 14 counts.

Reference is now made to Fig. 3*a* which illustrates the counting pattern which corresponds to the above mechanization of the circuit of Fig. 3. It will be noted that the natural counting cycle includes counts 1 through 15, inclusive, corresponding to the sequence of Table III, and also an unused count L. In the natural or free-running operation of the counter, if it should ever fall into the state L, as for example when the circuit is first energized, then it will remain in that state. The inclusion of the active synchronizing signal produces four altered counting cycles which are designated by means of dotted lines.

One altered counting cycle causes the counter to advance from count L to count 10. A second altered cycle causes count 8 to be followed by count 6. A third altered cycle causes count 11 to be followed by count 4, and a fourth altered cycle causes count 12 to advance to count 14.

Based upon the above altered counting cycles the possible synchronizing periods for the circuit of Fig. 3 then are:

$$D_{c1}=3,\ 18,\ 33,\ 48,\ .\ .\ .$$
$$D_{c2}=8,\ 23,\ 38,\ 53,\ .\ .\ .$$
$$D_{c3}=14,\ 29,\ 44,\ 59,\ .\ .\ .$$

When synchronism is to be initiated at 14 counts the precession phase requires a maximum of ten synchronizing periods, when the first synchronizing signal coincides either with the 7th or 10 count.

For initiating synchronous operation at three counts, however, precession cannot be relied on. This may be demonstrated by dividing all of the counts of the natural cycle into a first set including counts 1, 4, 7, 10, and 13; a second set including counts 2, 5, 8, 11, and 14; and a third set including counts 3, 6, 9, 12, and 15. If the first synchronizing signal coincides with one of the counts in the first set then subsequent signals will coincide with other counts of that set, in the absence of an altered counting cycle. Similarly, if the first synchronizing signal were to coincide with a count in the second set or in the third set, subsequent counts would precess within the same set.

It may be noted that there is no altered counting cycle to lead the precession out of the first set. But the predetermined count is in the second set of counts; therefore, proper synchronism would never be attained if the first synchronizing signal were to coincide with one of the counts of the first set.

If the first synchronizing signal were to coincide with one of the counts of the third set, precession would continue until count 12 was reached, and precession would then shift to the first set of counts. Thus again proper synchronism would not be attained.

The difficulty in initiating synchronism at three counts would also exist if synchronism at 18 counts were attempted. It may therefore be stated as a general proposition that whenever there is a common factor between the desired count and the natural count, there must be altered counting cycles which will lead the precession back to the particular set of counts in which the predetermined count is included, if synchronous operation is to be achieved.

Whereas only one specific mechanization has been illustrated in Fig. 3, it is apparent that synchronizing matrix 100–3 might be mechanized in many other ways. Either inhibiting signals or active synchronizing signals might be applied to any of the flip-flop input circuits of counter 200–3, thus providing a variety of mechanizations each of which would provide a different counting pattern.

Reference is now made to Fig. 4 illustrating a synchronizing matrix 100–4 which is utilized to control the operation of a counter 200–4, normally having a scale-of-15 operation under the control of a count control matrix 210–4, to operate as a scale-of-16 counter.

The natural counting function and the mechanization of counter 200–4 are the same as counter 200–3, described above in connection with Fig. 3. Synchronizing matrix 100–4 provides the same active synchronizing control as is provided by synchronizing matrix 100–3 of Fig. 3, and in addition provides an inhibiting signal of the type utilized in matrix 100–2 of Fig. 2. The counting pattern which corresponds to Fig. 4 is illustrated in Fig. 4*a*.

By reference to Fig. 4 it will be noted that the active synchronizing control is mechanized in a different manner from that shown in Fig. 3. The algebraic expression is the same, namely, $$1A=(D+S).Cp$$

In Fig. 3 matrix 100–3 is shown as providing only the "or" function (D+S), this signal then being supplied to count control matrix 210–3 where it is combined with the clock pulse $Cp$ in a conventional "and" circuit. In Fig. 4, however, the entire function is shown as being provided by matrix 100–4, utilizing an "and-or" circuit of the type described in copending U. S. patent application Serial No. 327,133 for "Diode, Pulse-Gating Circuits," by R. D. Forrest, filed December 20, 1952. It will be noted that this mechanization, which is equivalent to that shown in Fig. 3, requires only a single diode more than the normal mechanization of the counter in the absence of synchronizing means.

The inhibiting signal provided by matrix 100–4 is applied to the 0-input of flip-flop D, the specific mechanization being:

$$0D=C.Cp.\overline{S}$$

This mechanization has the effect of inhibiting the change of flip-flop D from 1 to 0, upon the occurrence of a synchronizing signal S. By referring to the normal counting sequence shown in Table III above it may be noted that this mechanization causes count 1 to repeat, count 6 to advance to count 15, count 9 to advance to count 14, and count 3 to advance to count 6. These altered counting cycles include 1, 7, 11, and 13 counts, respectively.

The counting pattern of Fig. 4*a* includes the altered counting cycles of Fig. 3*a*, plus the four additional altered cycles produced by the inhibiting signal. Accordingly, possible synchronizing periods for the circuit of Fig. 4 are as follows:

$$Dc_1=1, 16, 31, \ldots$$
$$Dc_2=3, 18, 33, 48, \ldots$$
$$Dc_3=7, 22, 37, 52, \ldots$$
$$Dc_4=8, 23, 38, 53, \ldots$$
$$Dc_5=11, 26, 41, \ldots$$
$$Dc_6=13, 28, 43, \ldots$$
$$Dc_7=14, 29, 44, \ldots$$

Synchronous operation of the circuit of Fig. 4 at 16 counts may be achieved and maintained despite the fact that a possible synchronizing period, 48 counts, is a multiple of the desired period. The reason for this is that, in order to maintain synchronous operation at 48 counts, a synchronizing signal must coincide with count 8 for producing the 3-count altered counting cycle. If another synchronizing signal occurs 16 counts later it will coincide with count 6, initiating the 7-count altered counting cycle. Two periods of 16 counts later the synchronizing signal will coincide with count 1, and synchronous operation at 16 counts is thereby initiated.

A particular advantage of utilizing a counting pattern according to Fig. 4*a* is that only the 1A and 0D flip-flop inputs would be affected. It would therefore be possible to utilize a shifting register of any desired type in lieu of flip-flops A, B, and C, for example, a magnetic drum shifting register might be utilized.

The time required for synchronous operation to be attained may if desired be minimized by controlling a greater number of flip-flop input circuits. For example, in the circuit of Fig. 4 the maximum number of synchronizing periods required for attaining synchronous operation can be reduced from 6 to 3 by including as additional circuit modifications:

$$0A=\overline{D}.Cp.\overline{S}$$
$$1D=(C+S).Cp$$

The application of the invention is not limited to the Johnson counters described in the preceding discussion, but also extends to many other types of counters, as for example, a binary counter. This type of application is illustrated in Fig. 5 wherein a synchronizing matrix 100–5 is utilized to control the operation of a binary counter 200–5, normally having scale-of-16 operation under the control of a count control matrix 210–5, to operate as a scale-of-17 counter.

The basic counter circuit of Fig. 5 is described in copending U. S. patent application Serial No. 245,860 for "High-Speed Flip-Flop Counters," by Eldred C. Nelson, filed September 10, 1951. The normal mechanization of matrix 210–5 to provide scale-of-16 operation is defined by the equations:

$$1A=0A=Cp$$
$$1B=0B=A.Cp$$
$$1C=0C=A.B.Cp$$
$$1D=0D=A.B.C.Cp$$

The natural counting cycle of counter 200–5 defined by these equations is indicated in Table IV below.

*Table IV*

| Count | D | C | B | A |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

In referring to Table IV it will be noted that although there are several count progressions where only one flip-flop changes state between one count and the succeeding count, for none of these is that particular change of that particular flip-flop unique. For example, in progressing from count 14 to count 15 only flip-flop A changes state, the change being from 0 to 1, but flip-flop A also changes from 0 to 1 at seven other points in the natural counting cycle. In advancing from count 7 to count 8 flip-flop D changes from 0 to 1 and this is the only point in the natural counting cycle where flip-flop D makes this change, but inhibiting this change of flip-flop D would not cause count 7 to repeat but instead would cause count 7 to advance to count 0. From these considerations it is apparent that it is necessary to utilize more than a single gating element to provide a repetition of one of the counts.

The specific mechanization of matrix 100–5 is defined by the equation:

$$1A=(B+C+D+\overline{S}).Cp$$

This mechanization alters the natural counting cycle only by producing a repetition of count 0 when signal S coincides therewith.

Two types of difficulties in obtaining initial synchronism of a counter have already been pointed out. In connection with Fig. 2 there has been illustrated the difficulty which may arise where the desired synchronizing period is a submultiple of another possible synchronizing period. In connection with Fig. 3 it has also been pointed out that a difficulty may arise where there is a common factor between the desired count Dc and the natural count Nc. In addition, there are other difficulties which may occur. Where two or more of the altered counting cycles provided by a particular mechanization include the same number of counts it is apparent that synchronous operation utilizing one of these altered counting cycles may be obtained, but there will be an ambiguity with respect to which count will correspond to the beginning of the synchronizing period.

The present invention has shown a method for constructing diagrammatically a counting pattern which includes the natural counting cycle and one or more altered counting cycles corresponding to a particular mechanization of the synchronizing matrix. In order to insure that the desired precession will be obtained the operation of the circuit may be traced with respect to the possible coincidence of the first synchronizing signal S with any one of the counts of the natural counting cycle.

In the foregoing discussion it has been shown that a counter synchronizing circuit may be simply mechanized by permitting the counter to precess during an initial operating period. It has also been shown that the operation of a counter may be synchronized in a cycle including a number of counts different from the natural count; for example, $2^n+1$ counts, where the counter includes $n$ stages and the natural count is $2^n$. Thus, specific embodiments have shown how a scale-of-8 counter may be operated at 9 counts, a scale-of-16 counter at 17 counts, a scale-of-15 counter at 16 counts, and a scale-of-15 counter at 14 counts. It has been demonstrated that the synchronizing circuits of the present invention not only simplify the circuit mechanization, but also minimize the loading effect of the synchronizing circuit upon the counter circuit.

It may be noted that, as a general rule, the synchronizing circuits of the present invention may be most simply mechanized when used in combination with a counter which includes in its natural counting sequence at least one change of count which involves a change in only one binary digit, that particular change in that particular digit occurring at no other point in the natural sequence. This type of counting sequence is not only characteristic of Johnson counters, as described in the preceding discussion, but also is characteristic of other counters as, for example, counters mechanized in the Gray or reflected binary code. This code is described in U. S. Patent No. 2,538,615 entitled "Decoder for Reflected Binary Codes" by Robert L. Carbrey, issued January 16, 1951.

Although in some applications the count signals or pulses Cp may themselves be periodic, recurring at evenly-spaced time intervals, this is not an essential limitation of the invention. It is essential, however, that synchronizing signals S have a period corresponding to a fixed number of signals Cp.

It may be noted that in the preceding discussion signal S has been considered as a voltage-level signal which exists during a particular count, including the terminal portion of the count when a count pulse or signal Cp is applied for producing the succeeding count. It is possible, however, for both signals S and Cp to be voltage-level signals, or for both to be pulses. In keeping with the present invention any type of circuit mechanization may be employed so long as signal Cp alone produces the next count of the natural cycle, and the additional occurrence of signal S during a particular count either will or will not produce an altered counting cycle, according to the particular mechanization.

It will be apparent to those skilled in the art that the method and circuits of the present invention have a wide variety of applications and are not limited to a particular type of counter or to a counter of any particular normal counting capacity.

What is claimed as new is:

1. A synchronizing circuit for synchronizing a counter at an altered count, the counter comprising a plurality of flip-flop stages each having a pair of input circuits controlled through separate gating circuits, the counter being normally operative in response to count pulses to produce a natural counting cycle including a first number of counts; said synchronizing circuit being responsive to applied synchronizing signals for establishing and maintaining operation of the counter in a counting cycle including a second number of counts, the period of said synchronizing signals being measurable by a number of count pulse periods equal to said second number, said second number being different from said first number, said synchronizing circuit comprising: first means coupled to at least one flip-flop input circuit and responsive to successive synchronizing signals for actuating the counter to precess until one synchronizing signal coincides with a predetermined count of the natural cycle; and second means coupled to at least one flip-flop input circuit and responsive to said one synchronizing signal for actuating the counter to initiate an altered counting cycle, the number of counts of said altered cycle being less than said second number by an integral multiple of said first number.

2. The synchronizing circuit defined in claim 1 wherein said first number of counts is $2^N$, said counter comprises N flip-flop stages, and said second number of counts is $2^N+1$, said second means being responsive to said one synchronizing signal for actuating the counter to repeat said predetermined count.

3. The circuit defined in claim 1 wherein said second means includes means for applying an inhibiting signal to at least one flip-flop input circuit.

4. The synchronizing circuit defined in claim 1 wherein said second means includes meas for applying an active synchronizing control to at least one flip-flop input circuit.

5. In combination, an electronic counter circuit having a natural counting cycle and a synchronizing matrix operable to control said counter circuit in a desired counting cycle different from said natural cycle; said counter circuit comprising a counting control matrix and a plurality of bistable elements and including means for applying count pulses, representing countable events, for producing successive counts of the natural cycle, said counter being also actuable during a predetermined count to produce an altered counting cycle; said synchronizing matrix comprising at least one gating element and including means for applying periodic synchronizing signals, having a period measurable in terms of countable events and different from the natural period of the counter, said matrix being responsive to said synchronizing signals for actuating the counter to produce said altered counting cycle when coincidence between one of said synchronizing signals and said predetermined count is achieved.

6. In combination, an electronic counter circuit having a natural counting cycle and a synchronizing matrix operable to control said counter circuit in a desired counting cycle different from said natural cycle; said counter circuit comprising a counting control matrix and a plurality of bistable elements and including means for applying count pulses, representing countable events, for producing successive counts of the natural cycle, said counter being also actuable during a predetermined count to produce an altered counting cycle; said synchronizing matrix comprising at least one gating element and including means for applying periodic synchronizing signals, having a period measurable in terms of countable events and different from the natural period of the counter, said matrix being operable to apply said synchronizing signals to the counter for producing coincidence of successive synchronizing signals with progressively different counts of the counter.

7. The synchronizing circuit defined in claim 1 wherein said first number of counts corresponds to 15 counts and said second number of counts corresponds to 14 counts.

8. The synchronizing circuit defined in claim 1 wherein said first number of counts corresponds to 15 counts and said second number of counts corresponds to 16 counts.

9. The synchronizing circuit defined in claim 2 wherein N is equal to 3.

10. The synchronizing circuit defined in claim 2 wherein N is equal to 4.

References Cited in the file of this patent

UNITED STATES PATENTS

| | | |
|---|---|---|
| 2,504,354 | Roschke | Apr. 18, 1950 |
| 2,527,638 | Kreer et al. | Oct. 31, 1950 |
| 2,546,316 | Peterson | Mar. 27, 1951 |
| 2,680,195 | Thompson | June 1, 1954 |